United States Patent
Feng

(10) Patent No.: US 11,129,217 B2
(45) Date of Patent: Sep. 21, 2021

(54) DATA SENDING METHOD AND APPARATUS, AND BASE STATION

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/069,827

(22) PCT Filed: Mar. 30, 2016

(86) PCT No.: PCT/CN2016/077917
§ 371 (c)(1),
(2) Date: Jul. 12, 2018

(87) PCT Pub. No.: WO2017/166141
PCT Pub. Date: Oct. 5, 2017

(65) Prior Publication Data
US 2019/0037621 A1    Jan. 31, 2019

(51) Int. Cl.
*H04W 76/14*  (2018.01)
*H04W 88/02*  (2009.01)
(Continued)

(52) U.S. Cl.
CPC .......... *H04W 76/14* (2018.02); *H04W 4/70* (2018.02); *H04W 28/0278* (2013.01);
(Continued)

(58) Field of Classification Search
None
See application file for complete search history.

(56) References Cited

U.S. PATENT DOCUMENTS

| 9,107,202 B2 | 8/2015 | Doppler |
| 2011/0106952 A1 | 5/2011 | Doppler |

(Continued)

FOREIGN PATENT DOCUMENTS

| CN | 102090132 A | 6/2011 |
| CN | 104105155 A | 10/2014 |

(Continued)

OTHER PUBLICATIONS

International Search Report in international application No. PCT/CN2016/077917, dated Dec. 30, 2016.
(Continued)

*Primary Examiner* — Gregory B Sefcheck
*Assistant Examiner* — Srinivasa R Reddivalam
(74) *Attorney, Agent, or Firm* — Ladas & Parry, LLP

(57) ABSTRACT

Provided are a data sending method, comprising: a first terminal sends to a base station a resource allocation request, the resource allocation request containing device attribute information of a second terminal; the first terminal receives transmission resource allocation information transmitted by the base station, wherein the transmission resource is determined by the base station according to the device attribute information; and the first terminal employs the transmission resource to transmit to the second terminal D2D data. In this way, when a second terminal is a low-cost terminal, and a first terminal is requesting for a resource in a semi-static or dynamic manner, the method in the embodiments of the present invention can determine, by sufficiently utilizing device attribute information of the low-cost terminal, a transmission resource within a receiving capability range of the second terminal, thus ensuring successful D2D transmission between the two terminals.

13 Claims, 6 Drawing Sheets

(51) Int. Cl.
  *H04W 72/04* (2009.01)
  *H04W 4/70* (2018.01)
  *H04W 76/11* (2018.01)
  *H04W 76/27* (2018.01)
  *H04W 28/02* (2009.01)
  *H04W 88/04* (2009.01)
  *H04W 80/02* (2009.01)

(52) U.S. Cl.
  CPC ............ *H04W 72/04* (2013.01); *H04W 76/11* (2018.02); *H04W 76/27* (2018.02); *H04W 88/02* (2013.01); *H04W 88/04* (2013.01); *H04W 80/02* (2013.01)

(56) References Cited

U.S. PATENT DOCUMENTS

| | | | |
|---|---|---|---|
| 2012/0020247 A1* | 1/2012 | Chun | H04L 1/0002 370/254 |
| 2014/0328329 A1* | 11/2014 | Novlan | H04W 56/002 370/336 |
| 2015/0043475 A1* | 2/2015 | Kim | H04L 5/0053 370/329 |
| 2015/0215903 A1 | 7/2015 | Zhao et al. | |
| 2015/0282213 A1* | 10/2015 | Sun | H04W 74/0833 370/329 |
| 2015/0312371 A1 | 10/2015 | Han et al. | |
| 2015/0341912 A1 | 11/2015 | Kim et al. | |
| 2016/0007383 A1 | 1/2016 | Chae et al. | |
| 2016/0050698 A1* | 2/2016 | Siomina | H04W 72/0493 370/329 |
| 2016/0183241 A1* | 6/2016 | Lee | H04W 56/0015 455/425 |
| 2016/0198518 A1* | 7/2016 | Baek | H04W 24/10 370/329 |
| 2017/0013640 A1* | 1/2017 | Loehr | H04W 76/14 |
| 2017/0070931 A1* | 3/2017 | Huang | H04W 36/08 |
| 2017/0359835 A1* | 12/2017 | Seo | H04W 72/14 |
| 2018/0054253 A1* | 2/2018 | Seo | H04B 7/2606 |
| 2018/0213379 A1* | 7/2018 | Xiong | H04W 40/22 |
| 2018/0242228 A1* | 8/2018 | Jung | H04W 8/24 |

FOREIGN PATENT DOCUMENTS

| | | | |
|---|---|---|---|
| CN | 104811892 A | | 7/2015 |
| CN | 104854916 A | | 8/2015 |
| CN | 104869526 A | * | 8/2015 |
| CN | 104869526 A | | 8/2015 |
| CN | 105099627 A | | 11/2015 |
| CN | 105208626 A | | 12/2015 |
| CN | 105338639 A | | 2/2016 |
| CN | 105357711 A | | 2/2016 |
| JP | 2014533475 A | | 12/2014 |
| JP | 2016036155 A | | 3/2016 |
| TW | 201541900 A | | 11/2015 |
| WO | 2014056426 A1 | | 4/2014 |
| WO | 2015020356 A1 | | 2/2015 |
| WO | 2015101218 A1 | | 7/2015 |
| WO | 2015112259 A1 | | 7/2015 |
| WO | 2015167747 A1 | | 11/2015 |
| WO | 2016013590 A1 | | 1/2016 |
| WO | 2016015664 A1 | | 2/2016 |
| WO | 2016019620 A1 | | 2/2016 |
| WO | 2016022001 A1 | | 2/2016 |

OTHER PUBLICATIONS

The Written Opinion of the International Search Authority in international application No. PCT/CN2016/077917, dated Dec. 30, 2016.

English translation of the Written Opinion of the International Search Authority in the international application No. PCT/CN2016/077917, dated Dec. 30, 2016.

Supplementary European Search Report in the European application No. 16895922.9, dated May 16, 2019.

Coolpad: "Discussion on Resource Allocation for ProSe UE-to-Network Relay", 3GPP Draft; R2-153252, 3rd Generation Partnership Project (3GPP), Mobile Competence Centre; 650, Route Des Lucioles; F-06921 Sophia-Antipolis Cedex; Fance, vol. RAN WG2, No. Beijing, China; Aug. 24, 2015-Aug. 28, 2015 Aug. 14, 2015(Aug. 14, 2015), XP050992999.

Coolpad: "Resource Allocation for IC and OOC Scenarios", 3GPP Draft; R2-156399 Resource Allocation for IC and OOC Scenarios, 3rd Generation Partnership Project (3GPP), Mobile Competence Centre; 650, Route Des Lucioles; F-06921 Sophia-Antipolis Cedex; Fra, vol. RAN WG2, No. Anaheim, USA; Nov. 16, 2015-Nov. 20, 2015 Nov. 16, 2015(Nov. 16, 2015), XP051005830.

ZTE: "Considerarion on the UE-to-Network Relays", 3GPP Draft; R2-151169—Considerations on the UE-to-Network Relays, 3rd Generation Partnership Project (3GPP), Mobile Competence Centre; 650, Route Des Lucioles; F-06921 Sophia-Antipolis Cedex; Fra, vol. RAN WG2, No. Bratislava, Slovakia; Apr. 20, 2015-Apr. 24, 2015 Apr. 11, 2015(Apr. 11, 2015), XP050953240.

Fujitsu Limited: "Resource allocation issues in the case of relay communication", 3GPP Draft; R2-156220 Resource Allocation Issues in the Case of Relay Commibication, 3rd Generation Partnership Project (3GPP), Mobile Competence Centre; 650, Route Des Lucioles; F-06921 Sophia-Anti, vol. RAN WG2, No. Anaheim, USA; Nov. 16, 2015-Nov. 20, 2015 Nov. 16, 2015(Nov. 16, 2015), XP051005733.

First Office Action of the Japanese application No. 2018-537461, dated Dec. 13, 2019.

Second Office Action of the Chinese application No. 201680078605.X, dated Mar. 16, 2020.

3GPP TS 23.303 V13.2.0 (Dec. 2015), 3rd Generation Partnership Project; Technical Specification Group Services and System Aspects; Proximity-based services (ProSe) Stage 2 (Release 13).

3GPP TS 36.306 V13.0.0 (Dec. 2015), 3rd Generation Partnership Project; Technical Specification Group Radio Access Network; Evolved Universal Terrestrial Radio Access (E-UTRA); User Equipment (UE) radio access capabilities (Release 13).

First Office Action of the Chinese application No. 201680078605.X, dated Oct. 8, 2019, with search report.

Decision of Refusal of the Chinese application No. 201680078605.X, dated Jul. 16, 2020.

First Office Action of the Indian application No. 201817029772, dated Jul. 20, 2020.

First Office Action of the Taiwanese application No. 106110876, dated Jul. 22, 2020.

Notice of Review of the Chinese application No. 201680078605.X, dated Mar. 5, 2021.

First Office Action of the European application No. 16695922.9, dated May 10, 2021.

Review Decision of the Chinese application No. 201680078605.X, dated May 11, 2021.

\* cited by examiner

DATA SENDING METHOD AND APPARATUS, AND BASE STATION

RELATED APPLICATION

This application is an application under 35 U.S.C. 371 of International Application No. PCT/CN2016/077917 filed on Mar. 30, 2016, the entire contents of which are incorporated herein by reference.

TECHNICAL FIELD

Embodiments of the disclosure relate to the field of communications, and more particularly to a data transmission method, a terminal and a base station.

BACKGROUND

Device-to-Device (D2D) communications, also called a terminal direct connection technology, refers to a data transmission manner in which neighboring terminals may perform data transmission through a Sidelink (SL) in a short-distance range. The data transmission between two devices for D2D communication does not need to be forwarded by a central node, i.e., a base station. D2D technology has the following advantages by virtue of its own short-distance communication characteristic and direct communication manner: 1. the short-distance direct communication manner between terminals may achieve a higher data rate, a shorter delay and lower power consumption; 2. by virtue of user terminals widely distributed in a network and a short-distance characteristic of D2D communication links, effective utilization of spectrum resources may be implemented, and a resource space division multiplexing gain may be obtained; 3. the D2D direct communication manner may be adapted to a local data sharing requirement of services such as wireless Person-to-Person (P2P) and provide data service with high flexible adaptability; and 4. D2D communication may extend coverage of the network by virtue of a large number of widely distributed communication terminals in the network.

D2D communication is not only used for public security services, but also may be widely used in commercial scenarios to solve practical problems such as coverage extension, device power saving and the like. For example, a terminal out of coverage of a cellular network may implement data communication with the network through a terminal as a relay, and thus extension of the coverage of the network is implemented in a sense and coverage enhancement may be achieved. In addition, D2D short-distance communication may reduce sending power of the terminal and favorably prolong service life of a battery of the terminal.

It should be noted that the D2D technology referred herein differs from a conventional short-distance communication technology. The conventional short range communication technology, such as Bluetooth, WiFi Direct, Zigbee and the like, may perform direct data transmission by using ungranted frequency bands, such as Industrial Scientific Medical (ISM), and form a relatively independent system from the Cellular network. However, the D2D technology refers to a terminal direct connection technology which shares granted frequency band resources with the cellular system.

In existing D2D communications, D2D transmission resources may be delivered in a dedicated signaling semi-static configuration, or may be acquired through a dynamical requesting by a terminal. However, the existing method does not consider an opposite terminal that performs the D2D communication with the terminal, which may result in the case that the allocated and requested D2D transmission resources cannot ensure a successful D2D communication.

SUMMARY

The embodiments of the disclosure provide a data transmission method, which may ensure D2D transmission between a first terminal and a second terminal.

A first aspect provides a data transmission method, which may include the following operations.

A first terminal sends a resource allocation request to a base station, wherein the resource allocation request includes device attribute information of a second terminal.

The first terminal receives configuration information for transmission resources sent by the base station, wherein the transmission resources are determined by the base station according to the device attribute information.

The first terminal sends Device to Device (D2D) data to the second terminal by using the transmission resources.

It can be seen that, in an embodiment of the disclosure, the first terminal may send the device attribute information of the second terminal to the base station, so that the resources allocated by the base station may not exceed the receiving capability range of the second terminal, thereby ensuring subsequent data transmission between the first terminal and the second terminal.

In combination with the first aspect, in one possible implementation mode, the resource allocation request may be carried in a Radio Resource Control (RRC) signaling.

Correspondingly, the operation that the first terminal receives configuration information for transmission resources sent by the base station may include that: the first terminal may receive configuration information for transmission resource pools sent by the base station, wherein the transmission resource pools may include the transmission resources. Moreover, the method may further include: before the operation that the first terminal sends the D2D data to the second terminal by using the transmission resources, the first terminal may select the transmission resources from the transmission resource pools.

In combination with the first aspect, in another possible implementation mode, the resource allocation request may be carried in a Medium Access Control (MAC) Protocol Data Unit (PDU).

In an example, the device attribute information may be identified by a Logical Channel ID (LCID) in the MAC PDU.

In an example, a specific field of Buffer Status Report (BSR) in the MAC PDU may include the device attribute information, and a format of the BSR may be identified by the LCID.

For example, a new format of the BSR can be defined, of which the specific field may include the device attribute information.

In an example, the device attribute information may include reception bandwidth of the second terminal.

In an example, the device attribute information may further include: transmission bandwidth of the second terminal, a maximum data block size received or sent by the second terminal, and a number of receiving or sending antennas of the second terminal.

In an example, the second terminal may be a low-cost terminal.

A second aspect of the disclosure provides a data transmission method, which may include the following operations.

A base station receives a resource allocation request sent by a first terminal, wherein the resource allocation request includes device attribute information of a second terminal.

The base station determines transmission resources to be used by the first terminal according to the resource allocation request.

The base station sends configuration information for the transmission resources to the first terminal, to enable the first terminal to send D2D data to the second terminal by using the transmission resources.

In combination with the second aspect, in one possible implementation mode, the resource allocation request may be carried in a RRC signaling.

Correspondingly, the operation that the base station determines transmission resources to be used by the first terminal according to the resource allocation request may include that: the base station may determine transmission resource pools according to the resource allocation request, wherein the transmission resource pools may include the transmission resources. Furthermore, the operation that the base station sends configuration information for the transmission resources to the first terminal may include that: the base station may send configuration information for the transmission resource pools to the first terminal, to enable the first terminal to send the D2D data to the second terminal by using the transmission resources in the transmission resource pools.

In combination with the second aspect, in another possible implementation mode, the resource allocation request may be carried in a MAC PDU.

In an example, the device attribute information may be identified by an LCID in the MAC PDU.

In an example, the device attribute information may be included in a specific field of BSR in the MAC PDU, and a format of the BSR may be identified by an LCID.

For example, a new format of the BSR may be defined, of which the specific field may include the device attribute information.

In an example, the device attribute information may include reception bandwidth of the second terminal.

In an example, the device attribute information may further include: transmission bandwidth of the second terminal, a maximum data block size received or sent by the second terminal, and a number of receiving or sending antennas of the second terminal.

In an example, the second terminal may be a low-cost terminal.

A third aspect of the disclosure provides a terminal, which may include a sending unit and a receiving unit. The terminal may be configured to implement each process executed by a first terminal in the data transmission of the first aspect or any implementation mode of the first aspect.

A fourth aspect of the disclosure provides a terminal, which may include a sender, a receiver and a processor. The terminal may be configured to implement each process executed by a first terminal in the data transmission of the first aspect or any implementation mode of the first aspect.

A fifth aspect of the disclosure provides a computer readable storage medium, which stores a program, and the program enables a first terminal to execute the data transmission method in the first aspect or any implementation mode of the first aspect.

A sixth aspect of the disclosure provides a base station, which may include a sending unit, a determination unit and a receiving unit. The base station may be configured to implement each process performed by a base station in the data transmission of the second aspect or any implementation mode of the second aspect.

A seventh aspect of the disclosure provides a base station, which may include a sender, a receiver and a processor. The base station may be configured to implement each process performed by a base station in the data transmission of the second aspect or any implementation mode of the second aspect.

An eighth aspect of the disclosure provides a computer readable storage medium, which stores a program, and the program enables the base station to execute the data transmission method in the second aspect or any implementation mode of the second aspect.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

It should be understood that the technical solutions in the embodiments of the disclosure may be applied to various communication systems, for example, a Global System for Mobile Communication (GSM), a Code Division Multiple Access (CDMA) system, a Wideband Code Division Multiple Access (WCDMA) system, a General Packet Radio Service (GPRS), an Long Term Evolution (LTE) system, an LTE Frequency Division Duplex (FDD), an LTE Time Division Duplex (TDD), a Universal Mobile Telecommunication System (UMTS) and the like.

It should also be understood that, in the embodiments of the disclosure, the base station may be a Base Transceiver Station (BTS) in the GSM or CDMA, may also be a NodeB in WCDMA, may further be an Evolutional Node B (eNB or eNodeB) in LTE or a base station device in a future 5th-Generation (5G) network and the like, which will not be limited in the embodiments of the disclosure. The base station may also be called as network equipment, a network side device and the like.

It should also be understood that, in the embodiments of the disclosure, the terminal device may communicate with one or more core networks through a Radio Access Network (RAN). The terminal device may be called as an access terminal, User Equipment (UE), a user unit, a user station, a mobile radio station, a mobile station, a remote station, a remote terminal, mobile equipment, a user terminal, a terminal, wireless communication equipment, a user agent or a user device. The terminal device may be a cellular phone, a cordless phone, a Session Initiation Protocol (SIP) phone, a Wireless Local Loop (WLL) station, a Personal Digital Assistant (PDA), handheld equipment with a wireless communication function, a computing device or other processing device connected to a wireless modem, vehicle-mounted equipment, wearable equipment, terminal equipment in the future 5G network and the like.

Figure 1:
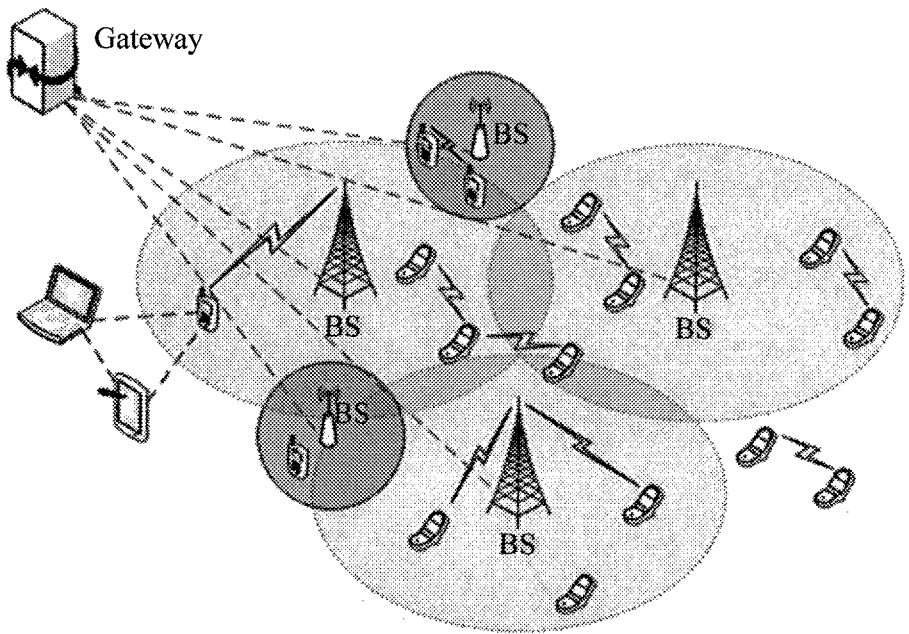
FIG. 1 is a schematic diagram of a scenario for a hybrid network.

D2D communication shares resources of the granted frequency bands with the cellular system, forming a unified hybrid cellular and D2D network. FIG. 1 illustrates a schematic diagram of a hybrid network. In a scenario of the hybrid network, terminals may communicate in two different modes. The first mode is a cellular communication mode: the terminals communicate through base stations. The second mode is a D2D mode: the terminals directly communicate by virtue of D2D links. It can be understood that, in this hybrid network, parts of the terminals still perform information forwarding and communication through the base stations in the cellular communication mode, but parts of the terminals perform direct data transmission in the D2D mode.

Figure 2:
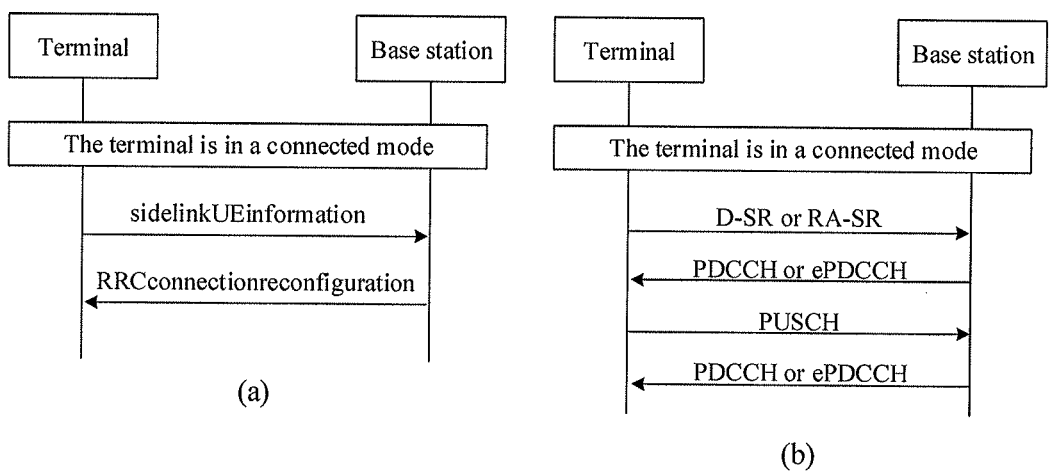
FIG. 2(a) and FIG. 2(b) are schematic flowcharts of a resource allocation method in the related art.

The transmission resources may be acquired in a dedicated signaling semi-static configuration or through a dynamical requesting by a terminal. FIG. 2(a) illustrates the manner of the dedicated signaling semi-static configuration, and FIG. 2(b) illustrates the manner of the dynamical requesting by a terminal.

In FIG. 2(a), in a case that a terminal is in a connected mode, when the terminal sends or intends to send data on a sidelink, a sidelinkUEinformation message, which includes information such as frequency point information of interest, is sent to a base station by the terminal. After receiving the message from the terminal, the base station may allocate a set of transmission resource pools and corresponding transmission resource configurations to the terminal through a Radio Resource Control (RRC) connection reconfiguration process. Further, the terminal may select resources for data transmission from the set of the transmission resource pools.

In FIG. 2(b), in the case that the terminal is in the connected mode, when the terminal intends to send data on the sidelink, a Dedicated-Scheduling Request (D-SR) or a Random Access-Scheduling Request (RA-SR) is sent, and the base station may allocate an uplink grant through a Physical Downlink Control Channel (PDCCH) or an enhanced PDCCH (ePDCCH). After receiving the uplink grant, the terminal may carry a SideLink-Buffer Status Reports (SL-BSR) in a Physical Uplink Shared Channel (PUSCH), and then the base station may allocate a grant for data transmission on the SL through the PDCCH or the ePDCCH according to the SL-BSR reported by the terminal.

However, with the rise of the Internet of things, supporting Machine Type Communication (MTC) in an LTE system attracts more and more attentions. A physical-layer enhancement project for MTC is set up in 3rd Generation Partnership Project (3GPP) Release 13. An MTC terminal, also called an MTC device, may have part of multiple Machine to Machine (M2M) communication characteristics, for example, characteristics of low mobility, small transmitted data volume, insensitivity to a communication delay, requirement on extremely low power consumption and the like. The M2M communication herein also belongs to D2D communication. For reducing cost of an MTC terminal, a new terminal type is defined and called a low-cost terminal, and both of its uplink and downlink support a 1.4 MHz radio frequency bandwidth or a lower system bandwidth, for example, 200 KHz. However, in the D2D communication illustrated in FIG. 2(a) and FIG. 2(b), when the sending terminal intends to send sidelink data, when there is no transmission resources, then the sending terminal requests the base station for transmission resources. However, when the receiving terminal is a low-cost terminal, then the resources allocated by the base station may exceed the reception range of the receiving terminal, which may result in the failure of the sidelink data transmission between the sending terminal and the receiving terminal.

Figure 3:
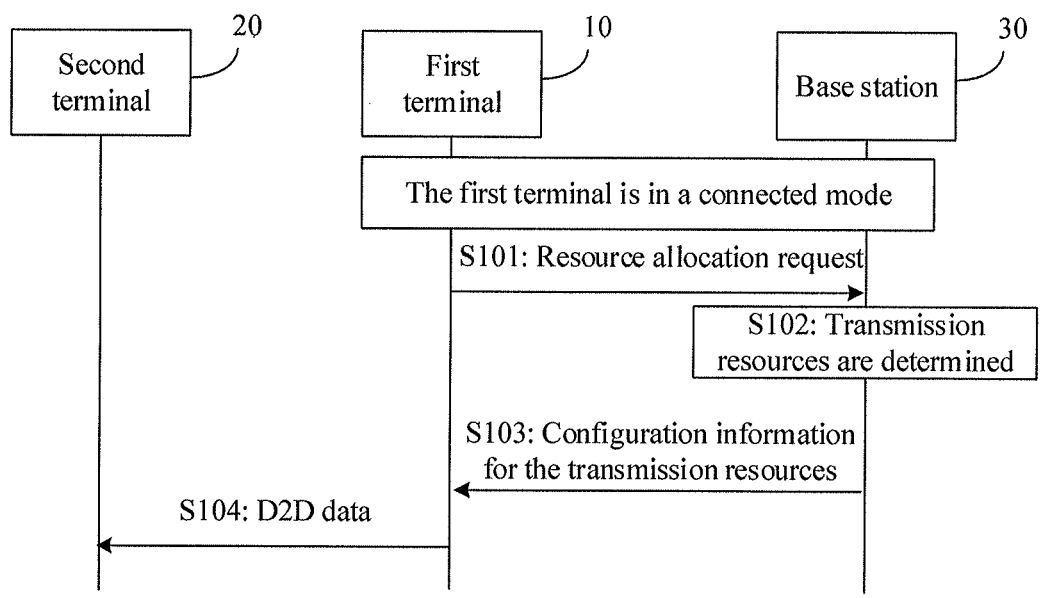
FIG. 3 is a schematic flowchart of a data transmission method according to an embodiment of the disclosure.
Figure 4:
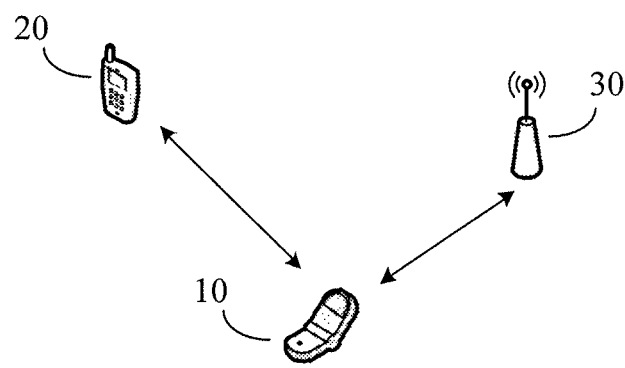
FIG. 4 is a schematic diagram of an application scenario according to an embodiment of the disclosure.

FIG. 3 is a schematic flowchart of a data transmission method according to an embodiment of the disclosure. Referring to FIG. 3, a first terminal 10, a second terminal 20 and a base station 30 are illustrated. As illustrated in FIG. 4, the first terminal 10 and the base station 30 may communicate with each other through a cellular link, and the first terminal 10 is in a connected mode. The first terminal 10 and the second terminal 20 may communicate with each other through a sidelink, also called as a D2D link.

In the example, the second terminal 20 may be a low-cost terminal. The low-cost terminal herein may be a low-cost smart terminal, or a low-cost terminal in the Internet of things and the like, which will not be limited in the disclosure.

In general, transmission bandwidth of a low-cost terminal is narrower than that of an ordinary terminal.

The method illustrated in FIG. 3 includes the following operations. At S101, a first terminal sends a resource allocation request to a base station, wherein the resource allocation request includes device attribute information of a second terminal.

It can be understood that the device attribute information of the second terminal may indicate that the second terminal is a low-cost terminal. The device attribute information of the second terminal may include reception bandwidth of the second terminal.

It can be understood that the first terminal 10 may be in a connected mode. The first terminal 10 may perform the operation in S101 when the first terminal 10 needs to send sidelink (SL) data to the second terminal 20. Herein, the SL data may also be called as D2D data.

Herein, the first terminal 10 may be called as a sending terminal or a sending end terminal, and the second terminal may be called as a receiving terminal or a receiving end terminal.

In the example, the device attribute information of the second terminal may include reception/transmission bandwidth of the second terminal.

Optionally, the device attribute information may include a maximum data block size received/sent by the second terminal. The device attribute information may also include a size of data blocks that can be received simultaneously by the second terminal.

Optionally, the device attribute information may also include a number of receiving/sending antennas of the second terminal.

Optionally, as an example, the resource allocation request may be carried in a Radio Resource Control (RRC) signaling. In other words, it can be understood that the resource allocation request may be transmitted in the manner of the RRC signaling. For example, as illustrated in S201 of FIG. 5, the RRC signaling may be a sidelinkUEinformation signaling, and the sidelinkUEinformation signaling includes the device attribute information of the second terminal 20.

Optionally, as another example, the resource allocation request may be carried in a Medium Access Control (MAC) Protocol Data Unit (PDU). In general, as illustrated in S301 of FIG. 6, the MAC PDU may include a Buffer Status Report (BSR).

Optionally, a specific MAC Control Element (CE) may be carried in the MAC PDU, and the device attribute information of the second terminal 20 may be carried by the MAC CE.

As an example, the BSR in the MAC PDU may be in an existing BSR format. Moreover, the BSR in the MAC PDU may be identified by using a Logical Channel ID (LCID) in the MAC PDU. For example, LCID "010" may represent that bandwidth of the second terminal is 100 kb, and LCID "011" may represent that the bandwidth of the second terminal is 300 kb, etc. It should be noted that the number of bits in the LCID will not be limited here. For example, it may be 3 bits, 5 bits or the like.

In this way, the device attribute information may be determined according to the LCID.

As another example, a new format of BSR can be defined, of which a specific field may carry the device attribute information of the second terminal 20.

Figure 7:
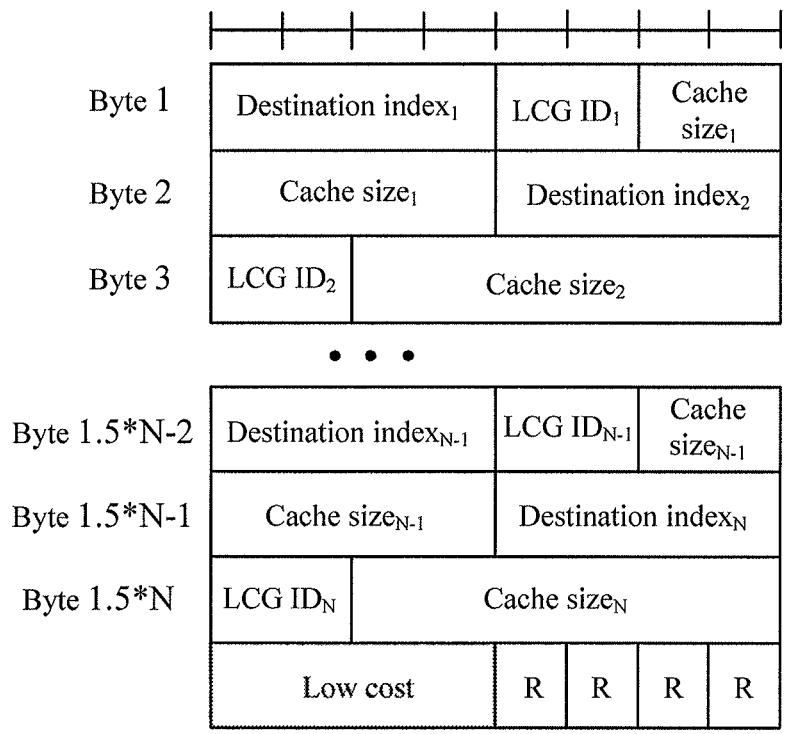
FIG. 7 is a schematic diagram of a BSR format according to an embodiment of the disclosure.

The newly defined BSR format may be called as a low-cost BSR. For example, one byte may be added to the existing BSR format to generate the newly defined BSR. Moreover, the added byte may be used to indicate the device attribute information of the second terminal. As illustrated in FIG. 7, one byte is added at the end of the existing BSR format, the first four bits of the added byte are used to indicate the low-cost terminal, and the last four bits are used as Reserved (R) bits. That is, a byte for indicating the low-cost terminal is added after the existing Logical Channel Group (LCG) ID is a cache of 1 to N.

It should be noted that, the newly defined BSR format will not be limited in the embodiments of the disclosure. For example, one byte may be added at the end of the existing BSR format as illustrated in FIG. 7, or, one byte may be added at the head of the existing BSR format.

Herein, the newly defined BSR format may be indicated by a Logical Channel ID (LCID).

For example, as illustrated in Table 1, the index "01011" may be used to indicate that the used BSR format is a low-cost BSR.

TABLE 1

| Index | LCID values |
|---|---|
| 00000 | Reserved |
| 00001-01010 | Identity of the logical channel |
| 01011 | Low cost BSR |
| 01100-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

In this way, the format of the transmitted BSR can be determined as the low-cost BSR illustrated in FIG. 7 according to an LCID, for example 01011. Further, the device attribute information can be acquired from the last byte of the low-cost BSR.

At S102, the base station 30 determines transmission resources to be used by the first terminal 10 according to the resource allocation request.

Specifically, according to the device attribute information, the base station 30 may determine the transmission resources which can be used for performing D2D transmission with the second terminal by the first terminal 10.

Specifically, the device attribute information may include reception bandwidth of the second terminal 20. The base station 30 may allocate transmission resources on the sidelink for the first terminal 10, and Physical Resource Block (PRB) configuration for the transmission resources may not exceed the reception bandwidth.

Figure 6:
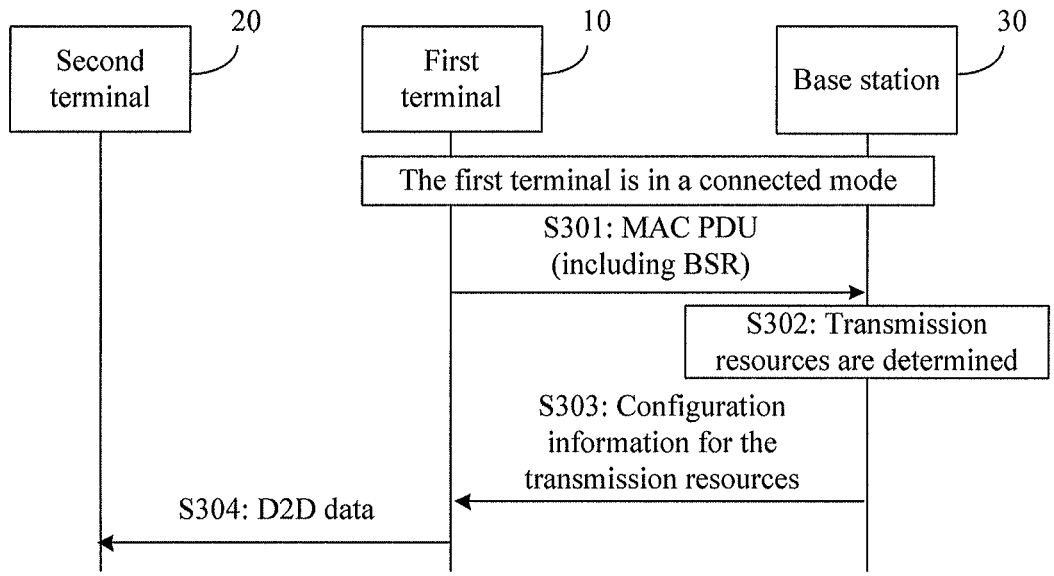
FIG. 6 is another schematic flowchart of a data transmission method according to an embodiment of the disclosure.

Optionally, as an example, when the resource allocation request is carried in the MAC PDU, then the operation in S120 may be the operation in S302 of FIG. 6.

Figure 5:
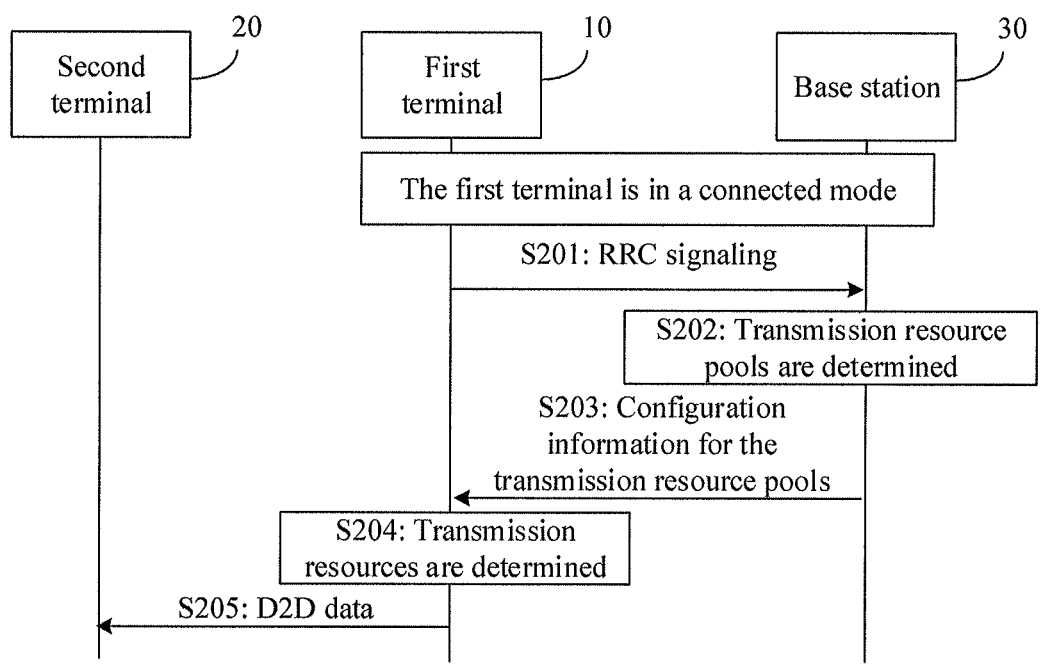
FIG. 5 is another schematic flowchart of a data transmission method according to an embodiment of the disclosure.

Optionally, as another example, when the resource allocation request is carried in the RRC signaling, the base station 30 may determine transmission resource pools available for the first terminal 10, as illustrated in S202 of FIG. 5. The transmission resource pools include the transmission resources. That is, the base station 30 allocates a set of resource pools for the first terminal 10.

At S103, the base station 30 sends configuration information for the transmission resources to the first terminal.

Optionally, as an example, when the resource allocation request is carried in the MAC PDU, the operation in S103 may be the operation in S303 of FIG. 6. Herein, the base station 30 may send configuration information for the transmission resources to the first terminal through a PDCCH or an ePDCCH.

Optionally, as another example, when the resource allocation request is carried in the RRC signaling, the operation in S103 may be the operation in S203 of FIG. 5. Herein, the base station 30 may perform transmission through a RRC connection reconfiguration process.

At S104, the first terminal 10 sends D2D data to the second terminal by using the transmission resources.

Herein, the D2D data is also called as SL data, which may include multiple data blocks.

Specifically, the first terminal 10 may determine a size of the sent data blocks, and send the data blocks to the second terminal 20 through a D2D link with the second terminal 20.

For example, the first terminal 10 may determine the size of the sent data blocks according to the PRB configuration for the transmission resources. For example, the first terminal 10 may determine the size of the sent data blocks according to the PRB configuration for the transmission resources and the maximum data block size received by the second terminal 20.

It can be understood that the data block size determined by the first terminal 10 should be less than the maximum data block size received by the second terminal 20.

Optionally, as an example, when the resource allocation request is carried in the MAC PDU, then S104 may be S304 of FIG. 6.

Optionally, as another embodiment, when the resource allocation request is carried in the MAC PDU, the operation in S104 may be the operations in S204 and S205 of FIG. 5.

At S204, the first terminal determines the transmission resources.

Specifically, the first terminal 10 may select the transmission resources from the transmission resource pools according to the configuration information for the transmission resource pools at S203.

At S205, the first terminal 10 sends the D2D data to the second terminal 20 by using the transmission resources selected in S204.

In this way, in an embodiment of the disclosure, during the process of semi-statically allocating resources, a sending end terminal may include device attribute information of a receiving end terminal into a dedicated signaling (e.g., an RRC signaling), which enables the base station to allocate transmission resources according to the device attribute information, thus ensuring the D2D communication between the sending end terminal and the receiving end terminal.

When the sending end terminal requests dynamic resources, the device attribute information of the receiving end terminal may be included into the MAC PDU, which enables the base station to allocate transmission resources according to the device attribute information, thus ensuring the D2D communication between the sending end terminal and the receiving end terminal.

It can be seen that, in the embodiment of the disclosure, the first terminal may send the device attribute information of the second terminal to the base station, thus ensuring that the resources allocated by the base station may not exceed a receiving capability range of the second terminal, and further ensuring the subsequent transmission between the first terminal and the second terminal.

Figure 8:
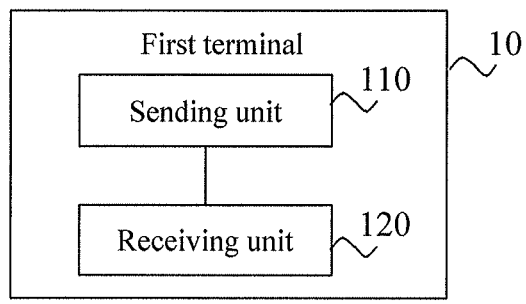
FIG. 8 is a structure block diagram of a first terminal according to an embodiment of the disclosure.

FIG. 8 is a schematic structure diagram of a terminal according to an embodiment of the disclosure. The terminal in FIG. 8 is a first terminal 10, which includes a sending unit 110 and a receiving unit 120.

The sending unit 110 is configured to send a resource allocation request to a base station, wherein the resource allocation request includes device attribute information of a second terminal.

The receiving unit 120 is configured to receive configuration information for transmission resources sent by the base station, wherein the transmission resources are determined by the station according to the device attribute information 1.

The sending unit 110 is further configured to send D2D data to the second terminal by using the transmission resources.

Optionally, the resource allocation request may be carried in a Radio Resource Control (RRC) Signaling. The first terminal 10 may further include a selecting unit. Specifically, the receiving unit 120 may be configured to receive configuration information for transmission resource pools sent by the base station, and the transmission resource pools may include the transmission resources. The selecting unit may be configured to select the transmission resources from the transmission resource pools.

Optionally, the resource allocation request may be carried in a Medium Access Control (MAC) Protocol Data Unit (PDU).

Figure 9:
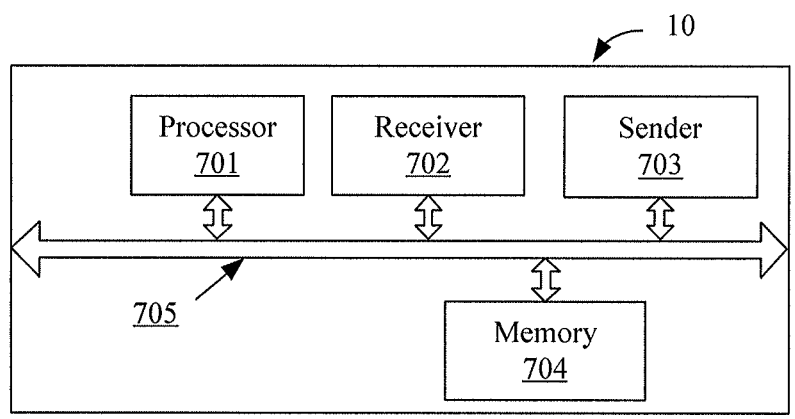
FIG. 9 is another structure block diagram of a first terminal according to an embodiment of the disclosure.

It should be noted that, in the embodiment of the disclosure, the sending unit 110 may be implemented by a sender, the receiving unit 120 may be implemented by a receiver, and the selecting unit may be implemented by a processor. As illustrated in FIG. 9, the first terminal 10 may include a processor 701, a receiver 702, a sender 703 and a memory 704. The memory 704 may be configured to store codes executed by the processor 701 and the like. The processor 701 may be configured to execute the codes stored by the memory 704. For example, the processor 701 may be configured to determine the size of data blocks to be sent.

Components in the first terminal 10 are coupled together via a bus system 705, wherein the bus system 705 includes a data bus, and further includes a power bus, a control bus and a state signal bus.

Figure 10:
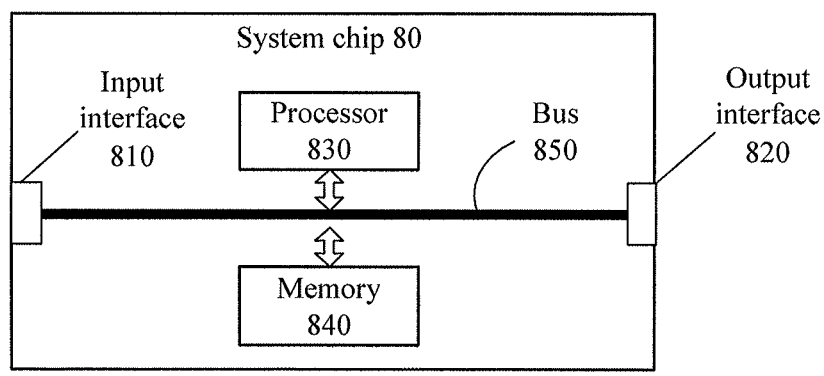
FIG. 10 is a schematic structure diagram of a system chip according to an embodiment of the disclosure.

FIG. 10 is another schematic structure diagram of the system chip according to an embodiment of the disclosure. The system chip 80 in FIG. 10 includes an input interface 810, an output interface 820, at least one processor 830 and a memory 840. The input interface 810, the output interface 820, the processor 830 and the memory 840 are connected through a bus 850. The processor 830 is configured to execute a code stored in the memory 840, and when the code is executed, the processor 830 implements the methods executed by a first terminal in FIG. 3.

The first terminal 10 illustrated in FIG. 8 or the first terminal 10 illustrated in FIG. 9 or the system chip 80 illustrated in FIG. 10 may implement each process implemented by the first terminal in any method embodiment of FIG. 3 to FIG. 6, which will not be elaborated herein to avoid repetitions.

Figure 11:
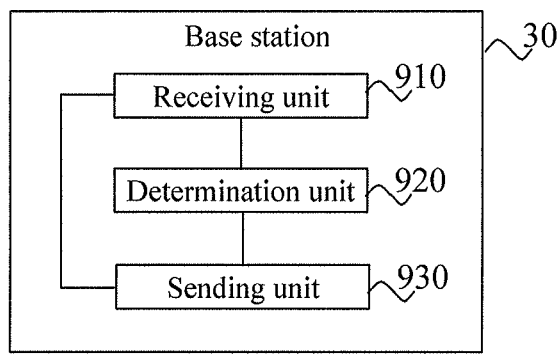
FIG. 11 is a structure block diagram of a base station according to an embodiment of the disclosure.

FIG. 11 is a structure block diagram of a base station according to an embodiment of the disclosure. The base station 30 in FIG. 11 includes a receiving unit 910, a determination unit 920 and a sending unit 930.

The receiving unit 910 is configured to send a resource allocation request, wherein the resource allocation request includes device attribute information of a second terminal.

The determination unit 920 is configured to determine transmission resources to be used by the first terminal according to the resource allocation request.

The sending unit 930 is configured to send configuration information for the transmission resources to the first terminal, to enable the first terminal to send Device to Device (D2D) data to the second terminal by using the transmission resources.

Figure 12:
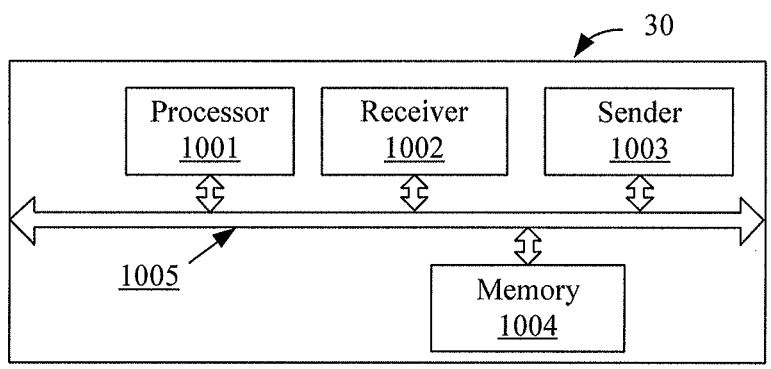
FIG. 12 is another structure block diagram of a base station according to an embodiment of the disclosure.

It should be noted that, in the embodiment of the disclosure, the receiving unit 910 may be implemented by a receiver, the determination unit 920 may be implemented by a processor, and the sending unit 930 may be implemented by a sender. As illustrated in FIG. 12, the base station 30 may include a processor 1001, a receiver 1002, a sender 1003 and a memory 1004. Herein, the memory 1004 may be configured to store a code executed by the processor 1001. The processor 1001 may be configured to execute the code stored by the memory 1004.

Components in the base station 30 are coupled together via a bus system 1005, wherein the bus system 1005 includes a data bus, and further includes a power bus, a control bus and a state signal bus.

Figure 13:
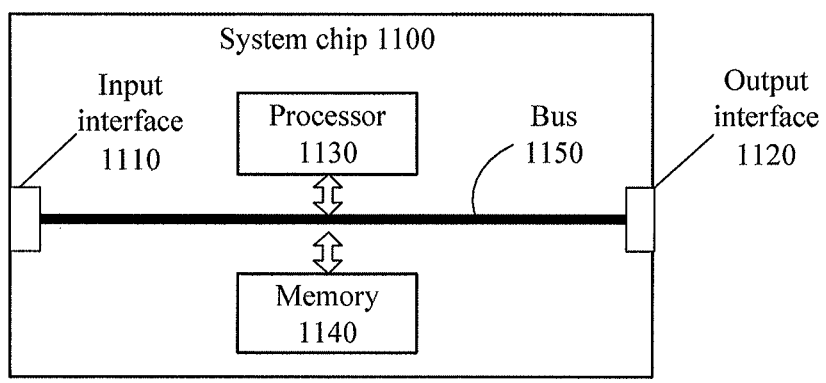
FIG. 13 is another schematic structure diagram of a system chip according to an embodiment of the disclosure.

FIG. 13 is another schematic structure diagram of the system chip according to an embodiment of the disclosure. The system chip 1100 in FIG. 13 includes an input interface 1110, an output interface 1120, at least one processor 1130 and a memory 1140. The input interface 1110, the output interface 1120, the processor 1130 and the memory 1140 are connected through a bus 1150. The processor 1130 is configured to execute a code stored in the memory 1140, and when the codes is executed, the processor 1130 implements the methods executed by a base station in FIG. 3.

The base station 30 illustrated in FIG. 11 or the base station 30 illustrated in FIG. 12 or the system chip 1100 illustrated in FIG. 13 may implement each process implemented by the base station in the method embodiments of FIG. 3, which will not be elaborated herein to avoid repetitions.

It can be understood that the processor in the embodiments of the disclosure may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical devices, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It should be noted that the memory of a system and method described in the disclosure is intended to include, but not limited to, memories of these and any other proper types.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, but such realization shall fall within the scope of the disclosure.

Those skilled in the art may clearly learn about those specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, comprising:
sending, by a first terminal, a resource allocation request to a base station, wherein the resource allocation request comprises device attribute information of a second terminal, such that resources allocated by the base station do not exceed a receiving capability range of the second terminal, and the device attribute information of the second terminal comprises at least one of: a number of receiving antennas of the second terminal, or a number of sending antennas of the second terminal;

receiving, by the first terminal, configuration information for transmission resources sent by the base station, wherein the transmission resources are determined by the base station according to the device attribute information; and sending, by the first terminal, Device to Device (D2D) data to the second terminal by using the transmission resources, wherein the resource allocation request is carried in a Medium Access Control (MAC) Protocol Data Unit (PDU), the MAC PDU comprises a low-cost Buffer Status Report (BSR), the low-cost BSR is generated by adding one byte to an existing BSR format, and the added one byte is used to indicate the device attribute information of the second terminal.

2. The method according to claim 1, wherein receiving, by the first terminal, the configuration information for the transmission resources sent by the base station comprises:

receiving, by the first terminal, configuration information for transmission resource pools sent by the base station, wherein the transmission resource pools comprise the transmission resources.

3. The method according to claim 2, further comprising: before sending, by the first terminal, the D2D data to the second terminal by using the transmission resources, selecting, by the first terminal, the transmission resources from the transmission resource pools.

4. The method according to claim 1, wherein the device attribute information is identified by a Logical Channel ID (LCD) in the MAC PDU.

5. The method according to claim 1, wherein a format of the BSR is identified by an LCD.

6. The method according to claim 1, wherein the second terminal is a low-cost terminal.

7. A data transmission method, comprising:

receiving, by a base station, a resource allocation request sent by a first terminal, wherein the resource allocation request comprises device attribute information of a second terminal, such that resources allocated by the base station do not exceed a receiving capability range of the second terminal, and the device attribute information of the second terminal comprises at least one of: a number of receiving antennas of the second terminal, or a number of sending antennas of the second terminal;

determining, by the base station, transmission resources to be used by the first terminal according to the resource allocation request; and sending, by the base station, configuration information for the transmission resources to the first terminal, to enable the first terminal to send Device to Device (D2D) data to the second terminal by using the transmission resources, wherein the resource allocation request is carried in a Medium Access Control (MAC) Protocol Data Unit (PDU), the MAC PDU comprises a low-cost Buffer Status Report (BSR), the low-cost BSR is generated by adding one byte to an existing BSR format, and the added one byte is used to indicate the device attribute information of the second terminal.

8. A terminal, comprising: a memory, a processor, and a computer program stored on the memory and capable of running on the processor, wherein the computer program, when executed by the processor, cause the processor to execute operations comprising:

sending a resource allocation request to a base station, wherein the resource allocation request comprises device attribute information of a second terminal, such that resources allocated by the base station do not exceed a receiving capability range of the second terminal, and the device attribute information of the second terminal comprises at least one of: a number of receiving antennas of the second terminal, or a number of sending antennas of the second terminal; and receiving configuration information for transmission resources sent by the base station, wherein the transmission resources are determined by the base station according to the device attribute information;

wherein the processor is further configured to: send Device to Device (D2D) data to the second terminal through the transmission resources, wherein the resource allocation request is carried in a Medium Access Control (MAC) Protocol Data Unit (PDU), the MAC PDU comprises a low-cost Buffer Status Report (BSR), the low-cost BSR is generated by adding one byte to an existing BSR format, and the added one byte is used to indicate the device attribute information of the second terminal.

9. The terminal according to claim 8, wherein the processor is specifically configured to:

receive configuration information for transmission resource pools sent by the base station, wherein the transmission resource pools comprise the transmission resources.

10. The terminal according to claim 9, wherein the processor is further configured to:

select the transmission resources from the transmission resource pools.

11. The terminal according to claim 8, wherein the device attribute information is identified by a Logical Channel ID (LCD) in the MAC PDU.

12. The terminal according to claim 8, wherein a format of the BSR is identified by an LCD.

13. The terminal according to claim 8, wherein the second terminal is a low-cost terminal.

* * * * *